United States Patent
Li et al.

(10) Patent No.: US 12,173,622 B1
(45) Date of Patent: Dec. 24, 2024

(54) COMPOSITE BLADE WITH TAPERED ROOT SECTION

(71) Applicant: RTX CORPORATION, Farmington, CT (US)

(72) Inventors: Xuetao Li, South Glastonbury, CT (US); George Alan Salisbury, East Hampton, CT (US); Royce E. Tatton, Shelley, ID (US); Thomas J. Robertson, Glastonbury, CT (US); Darin S. Lussier, Guilford, CT (US); Po-Ching Yeh, Woodbridge, CT (US); Jason H. Elliott, Huntington, IN (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/486,419

(22) Filed: Oct. 13, 2023

(51) Int. Cl.
*F01D 5/30* (2006.01)
*F01D 5/28* (2006.01)

(52) U.S. Cl.
CPC ........... *F01D 5/3007* (2013.01); *F01D 5/282* (2013.01); *F01D 5/284* (2013.01); *F01D 5/3084* (2013.01); F05D 2220/32 (2013.01); F05D 2240/30 (2013.01); F05D 2300/6033 (2013.01); F05D 2300/6034 (2013.01); F05D 2300/614 (2013.01)

(58) Field of Classification Search
CPC ........ F01D 5/3007; F01D 5/282; F01D 5/284; F01D 5/3084; F05D 2220/32; F05D 2240/30; F05D 2300/6033; F05D 2300/6034; F05D 2300/614
See application file for complete search history.

(56) References Cited

U.S. PATENT DOCUMENTS

| | | | | |
|---|---|---|---|---|
| 3,752,600 | A * | 8/1973 | Walsh | F01D 5/282 415/217.1 |
| 4,111,606 | A * | 9/1978 | Prewo | C22C 47/068 416/241 A |
| 7,918,652 | B2 | 4/2011 | Fujimura | |
| 8,100,662 | B2 | 1/2012 | Schreiber | |
| 10,174,624 | B1 * | 1/2019 | McCaffrey | F01D 5/3007 |
| 10,746,030 | B2 | 8/2020 | Le Meur et al. | |
| 11,306,597 | B2 | 4/2022 | Okabe et al. | |
| 2008/0187441 | A1 * | 8/2008 | Schreiber | B29C 70/202 416/229 R |
| 2015/0292340 | A1 | 10/2015 | Kawanishi et al. | |
| 2018/0112542 | A1 | 4/2018 | Bouthillier et al. | |

FOREIGN PATENT DOCUMENTS

DE 102017213326 2/2019

* cited by examiner

*Primary Examiner* — Courtney D Heinle
*Assistant Examiner* — Andrew J Marien
(74) *Attorney, Agent, or Firm* — Carlson, Gaskey & Olds, P.C.

(57) ABSTRACT

A blade includes an airfoil section and a root section that extends in a chord-wise direction between leading and trailing root faces and in a radial direction that is perpendicular to the chord-wise direction from an inner root face to the second end of the airfoil section. The root section defines a dovetail cross-section that is perpendicular to the chord-wise direction. The airfoil section and the root section are comprised of a composite material architecture that includes inter-section fiber plies that each extend from the leading to the trailing edge and from the airfoil section into the root section. Wedges extend in the root section and are interleaved with the inter-section fiber plies. Each of the wedges tapers in the chord-wise direction and the radial direction.

8 Claims, 3 Drawing Sheets

FIG.5

COMPOSITE BLADE WITH TAPERED ROOT SECTION

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the fan section or other sections of the engine may be formed of metallic alloys or composite material. Composite materials are generally lighter in weight, but can challenge durability and manufacturability.

SUMMARY

A blade according to an example of the present disclosure includes an airfoil section that defines leading and trailing edges and spans between first and second radial ends. There is a root section at the second end of the airfoil section that extends in a chord-wise direction between leading and trailing root faces and in a radial direction that is perpendicular to the chord-wise direction from an inner root face to the second end of the airfoil section. The root section defines a dovetail cross-section that is perpendicular to the chord-wise direction. The airfoil section and the root section are comprised of a composite material architecture that has inter-section fiber plies each extending from the leading edge to the trailing edge and from the airfoil section into the root section, and wedges each extending in the root section and interleaved with the inter-section fiber plies in the root section. Each of the wedges taper in the chord-wise direction such that along the chord-wise direction the dovetail cross-section tapers between the leading and trailing root faces, and each of the wedges tapers in the radial direction such that along the radial direction the dovetail cross-section tapers between the inner root face and the second end of the airfoil section.

In a further embodiment of any of the foregoing embodiments, each of the wedges includes wedge fiber plies that terminate in the chord-wise direction at respective chord-wise ply drops. The chord-wise ply drops define step-wise chord spacings there between.

In a further embodiment of any of the foregoing embodiments, the step-wise chord spacings are equal to each other.

In a further embodiment of any of the foregoing embodiments, the wedge fiber plies terminate at respective radial ply drops. The radial ply drops define step-wise radial spacings.

In a further embodiment of any of the foregoing embodiments, the step-wise radial spacings are equal to each other.

In a further embodiment of any of the foregoing embodiments, the dovetail cross-section defines a width along a tangential direction that is perpendicular to the chord-wise direction, and the dovetail cross-section tapers in the tangential direction from a maximum width at the leading root face to a minimum width at the trailing root face.

In a further embodiment of any of the foregoing embodiments, the first fiber plies and the second fiber plies are carbon fiber plies.

A gas turbine engine according to an example of the present disclosure includes a hub disposed about a central engine axis. The hub defines a circumferential row of dovetail slots, and a plurality of blades according to any of the foregoing embodiments is supported on the hub.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
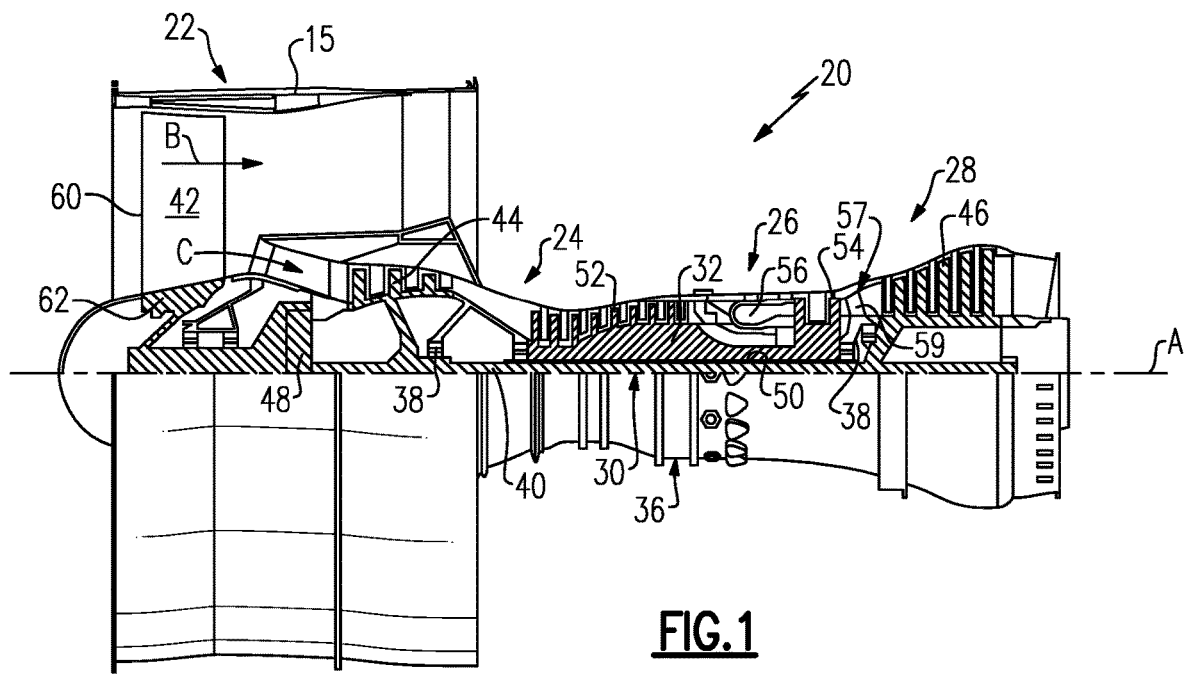
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram }° \text{R})/(518.7° \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
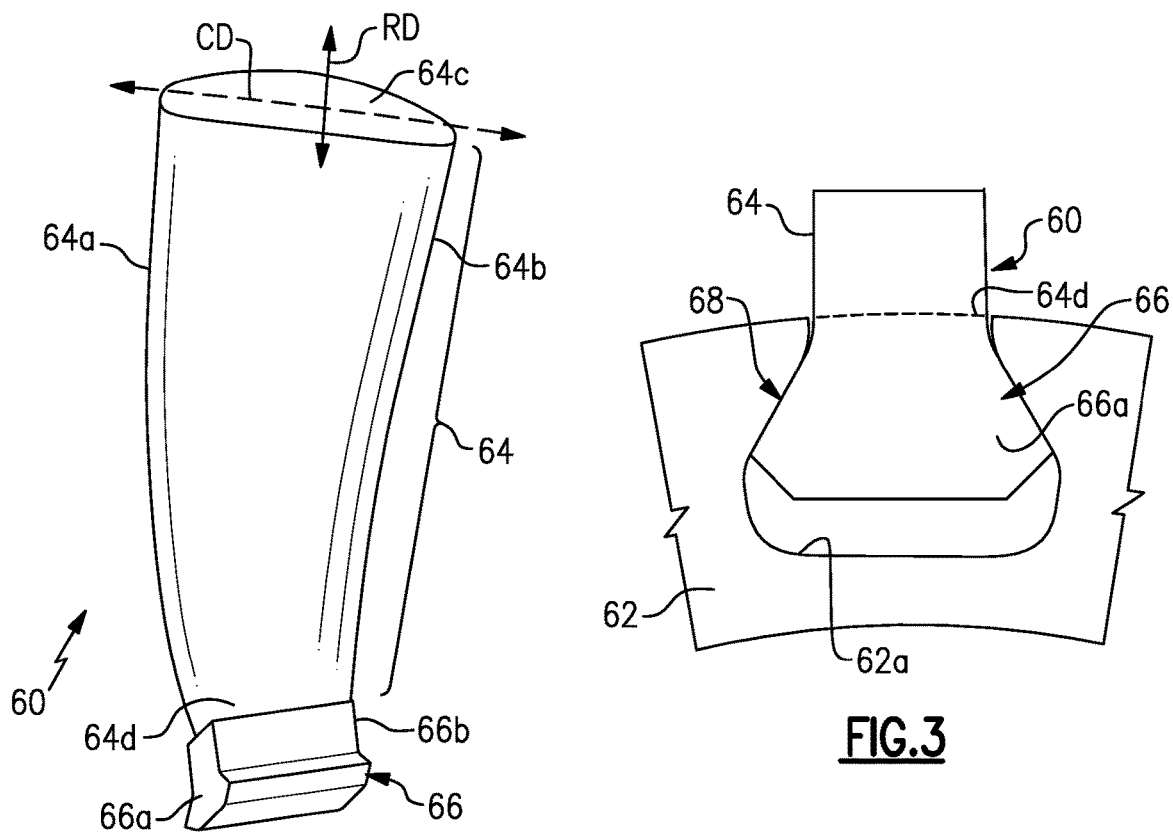
FIG. 2 illustrates a fan blade.
Figure 3:
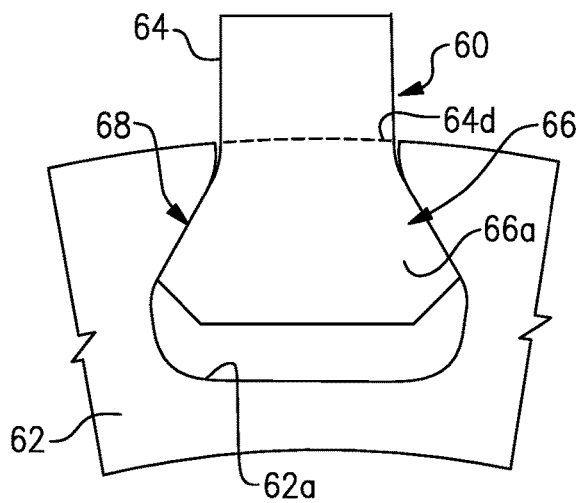
FIG. 3 illustrates a root section of the fan blade held in a hub.

Turning again to the fan 42, the fan 42 includes at least one circumferential row of fan blades 60 that are mounted to a hub 62. FIG. 2 illustrates a representative one of the fan blades 60, and FIG. 3 shows attachment of the fan blade 60 to the hub 62. The blade 60 includes an airfoil section 64 that has leading and trailing edges 64a/64b that define a chord-wise direction CD, which in some instances may be an axial direction. In a radial direction RD, which is generally perpendicular to the chord-wise direction, the airfoil section 64 spans between first and second radial ends 64c/64d. In this example, the first end 64c is a radially outer end and the second end 64d is a radially inner end. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The blade 60 includes a root section 66 at the second end 64d of the airfoil section 64. The root section serves to attach the blade 60 to the hub 62. In that regard, the hub 62 includes a circumferential row of axial slots 62a that have a geometry in complement to the geometry of the root section 66 such that the slot 62a radially retains the root section 66, and thus the blade 60.

The root section 66 extends in the chord-wise direction CD between leading and trailing root faces 66a/66b. The periphery of the root section 66 defines a dovetail cross-section 68 in a plane that is perpendicular to the chord-wise direction CD. It is to be understood that the particular geometry of the dovetail cross-section 68 that shown can be varied. In general, however, the dovetail cross-section 68 flares so as to form a wedge shape that interlocks with the slot 62a.

Figure 4:
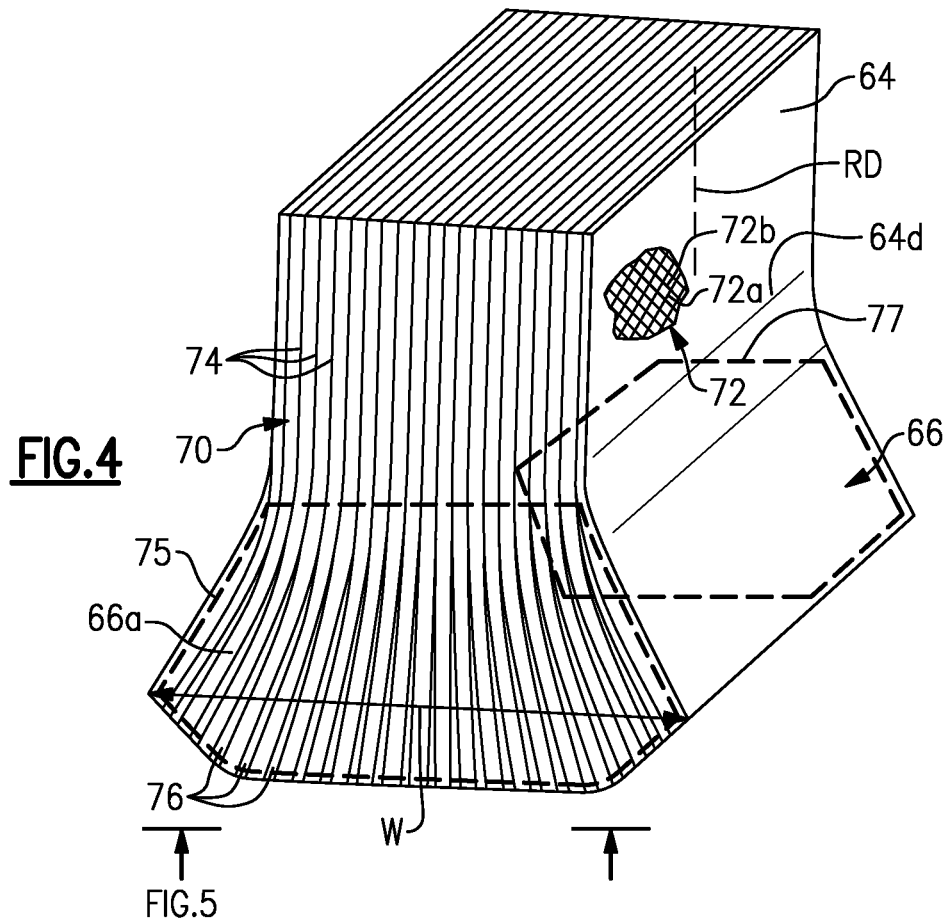
FIG. 4 illustrates the root section of the blade.

Referring to FIG. 4, the airfoil section 64 and the root section 66 are formed of a composite material architecture 70. The "architecture" refers to the structural configuration of the material. The composite material 72 (shown in cutaway) that makes up the architecture 70 is a fiber-reinforced composite that generally includes fiber tows 72a disposed in a matrix 72b. For example, the fiber tows 72a are lightweight, high-strength fiber tows, such as but not limited to, carbon fiber tows, aramid fiber tows, or glass fiber tows. The matrix 72b is a polymer matrix, such as but not limited to, epoxy.

The architecture 70 includes inter-section fiber plies 74. A "ply" refers to a layer of fiber tows. For example, the layer includes a woven fabric, a tape with multiple fiber tows, or multiple fabrics and/or tapes that together make-up a distinct layer. Each ply 74 extends from the leading edge 64a to the trailing edge 64b, and the prefix "inter-" means that each ply 74 extends in both the airfoil section 64 and the root section 66. In the root section 66, there are wedges 76 interleaved with the plies 74 and that serve to increase the width W of the root section 66, which is generally in a tangential direction.

Figure 5:
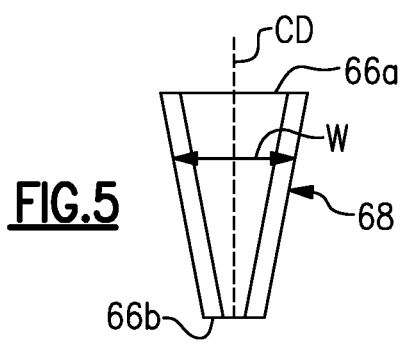
FIG. 5 illustrates the tapering of the root section of the blade.

Each of the wedges 76 tapers in at least the chord-wise direction CD such that along the chord-wise direction CD the dovetail cross-section 68 tapers from a maximum cross-sectional area at the leading root face 66a to a minimum cross-sectional area at the trailing root face 66b, as represented in FIG. 5. The maximum cross-sectional area is also represented at 75 in FIG. 4, and the minimum cross-section is represented at 77.

Figure 6:
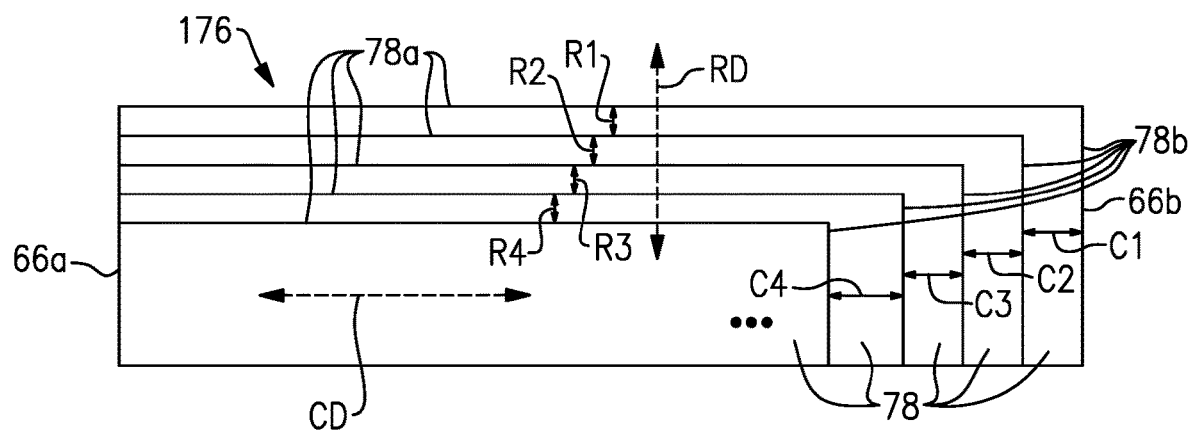
FIG. 6 illustrates a wedge from a composite material architecture of the blade.

FIG. 6 illustrates an example of one of the wedges 76. In this example, the wedge 76 is a multi-layered fiber ply structure that includes wedge fiber plies 78 arranged in a stacked relationship. Five wedge plies are shown, although it is to be understood that fewer wedge fiber plies 78 or additional wedge fiber plies can be used to control the taper ratio of the root section 66. Each of the fiber plies 78 terminates in the radial direction RD such that along the radial direction RD the dovetail cross-section 68 tapers. For instance, each of the wedge fiber plies 78 terminates at respective radial ply drop 78a. The radial ply drops 78a define step-wise radial chord spacings R1/R2/R3/R4 there between. For instance, from the first wedge fiber ply 78 to the last wedge ply 78 in the stack, the wedge fiber plies 78 are of progressively longer radial lengths. As a result, the wedge 76 tapers along the radial direction RD. Thus, when the wedges 76 are interleaved between the plies 74, the wedges 76 not only increase the width W of the root section 66 but also impart a radial taper to the root section 66 to give the root section 66 its dovetail shape for interlocking with the slot 62. In the illustrated example, the step-wise radial spacings R1/R2/R3/R4 are equal to each other in order to produce a constant radial taper in the root section 66. In other examples, the step-wise radial spacings R1/R2/R3/R4 are unequal in order to produce a non-constant radial taper. Thus, the radial taper ratio of the root section 66 can be controlled through selection of the number of plies 78 and selection of the step-wise radial spacings R1/R2/R3/R4 in order to achieve a desired radial taper for the root section 66 and smooth transition from the root section 66 into the airfoil section 64.

The wedge 76 also tapers in the chord-wise direction CD at respective chord-wise ply drops 78b. The chord-wise ply drops 78b define step-wise chord spacings C1/C2/C3/C4 there between. For instance, from the first wedge fiber ply 78 to the last wedge ply 78 in the stack, the wedge fiber plies 78 are of progressively longer lengths. As a result, the wedge 76 tapers along the chord-wise direction CD. Thus, when the wedges 76 are interleaved between the plies 74, the wedges 76 not only increase the width W of the root section 66 but also impart the taper to the root section 66 in order to transition from the maximum cross-sectional area 75 to the minimum cross-sectional area 77. For example, in the initial chord-wise region beginning from the leading root face 66a, the wedges 76 impart a full width of all five of the wedge plies 78. Farther along the chord-wise direction, after the ply drop 78b of the shortest ply 78, the wedge 76 imparts a thickness of only four plies 78, and so on and so forth as the width decreases along the chord-wise direction CD with each ply drop 78a. In one example, the root section 66 has a maximum width at the leading root face 66a and tapers to a minimum width at the trailing root face 66b.

In the illustrated example, the step-wise chord spacings C1/C2/C3/C4 are equal to each other in order to produce a constant taper in the root section 66. In other examples, the step-wise chord spacings C1/C2/C3/C4 are unequal in order to produce a non-constant taper. Thus, the taper ratio of the root section 66 can be controlled through selection of the number of plies 78 and selection of the step-wise chord spacings C1/C2/C3/C4 in order to achieve a desired taper profile for the root section 66.

The blades 60 herein can be fabricated via ply lay-up process and/or an automated fiber placement (AFP) process, but are not limited to these processes. For example, in a ply lay-up process, the inter-section fiber plies 74, such as pre-impregnated woven fabrics, are laid one-by-one onto a support surface. After each ply 74 is laid, a wedge 76/176 is laid in the location that will become the root section 66. Once all of the plies 74 and wedges 76/176 are laid, the resulting fiber preform is then consolidated under heat and pressure, such as in a mold, to form the final blade geometry and cure the matrix 72b. The wedge fiber plies 78 of the wedges 76/176 are also pre-impregnated, but may alternatively be pre-consolidated/pre-cured prior to lay-up. In an AFP process, a machine places each tow or tape in accordance with computer-aided design data that contains programmed information of the composite material architecture 70 to form the inter-section fiber plies 74 and the wedge fiber plies 78 of the wedges 76/176. In further examples, both lay-up and AFP are used, wherein a portion of the plies 74 and/or the wedge fiber plies 78 are manually laid-up and a portion of the plies 74 and/or the wedge fiber plies 78 are deposited by AFP.

The disclosed composite material architecture 70 provides the root section 66 with a thicker region at the leading root face 66a, which enables the leading edge 64a of the airfoil section 64 that may be subjected to impacts from foreign objects to be thicker to facilitate greater strength, impact resistance, and durability life. The trailing region of the root section 66 that does not require as high of strength is narrower and thus reduces weight in comparison to a root section that is the full thickness throughout the length. Additionally, the inter-section fiber plies 74 impart enhanced stiffness and strength by continuously spanning both the root section 66 and the airfoil section 64, while the wedges 76/176 provide the ability to tailor the geometry of the root section 66 for strength or other requirements. Moreover, since the root section 66 tapers, the tapered slot 62a in the hub 62 will axially retain the blade in the axially aft direction, eliminating a need for blade retention features in that direction.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:
1. A blade comprising:
an airfoil section defining leading and trailing edges and spanning between first and second radial ends; and a root section at the second end of the airfoil section, the root section extending in a chord-wise direction between leading and trailing root faces and in a radial direction that is perpendicular to the chord-wise direction from an inner root face to the second end of the airfoil section, the root section defining a dovetail cross-section that is perpendicular to the chord-wise direction, the airfoil section and the root section being comprised of a composite material architecture including:
  - inter-section fiber plies each extending from the leading edge to the trailing edge and from the airfoil section into the root section, and
  - wedges each extending in the root section and interleaved with the inter-section fiber plies in the root section, each of the wedges tapering in the chord-wise direction such that, along the chord-wise direction, the dovetail cross-section tapers between the leading and trailing root faces, and each of the wedges tapering in the radial direction such that, along the radial direction, the dovetail cross-section tapers between the inner root face and the second end of the airfoil section.

2. The blade as recited in claim 1, wherein each of the wedges includes wedge fiber plies that terminate in the chord-wise direction at respective chord-wise ply drops, the chord-wise ply drops defining step-wise chord spacings there between.

3. The blade as recited in claim 2, wherein the step-wise chord spacings are equal to each other.

4. The blade as recited in claim 2, wherein the wedge fiber plies terminate at respective radial ply drops, the radial ply drops define step-wise radial spacings.

5. The blade as recited in claim 4, wherein the step-wise radial spacings are equal to each other.

6. The blade as recited in claim 1, wherein the dovetail cross-section defines a width along a tangential direction that is perpendicular to the chord-wise direction, and the dovetail cross-section tapers in the tangential direction from a maximum width at the leading root face to a minimum width at the trailing root face.

7. The blade as recited in claim 2, wherein the wedge fiber plies are carbon fiber plies.

8. A gas turbine engine comprising:
  - a hub disposed about a central engine axis, the hub defining a circumferential row of dovetail slots;
  - a plurality of blades supported on the hub, each of the blades including:
    - an airfoil section defining leading and trailing edges and spanning between first and second radial ends; and
    - a root section at the second end of the airfoil section, the root section extending in a chord-wise direction between leading and trailing root faces and in a radial direction that is perpendicular to the chord-wise direction from an inner root face to the second end of the airfoil section, the root section defining a dovetail cross-section that is perpendicular to the chord-wise direction, the airfoil section and the root section being comprised of a composite material architecture including:
      - inter-section fiber plies each extending from the leading edge to the trailing edge and from the airfoil section into the root section, and
      - wedges each extending in the root section and interleaved with the inter-section fiber plies in the root section, each of the wedges tapering in the chord-wise direction such that, along the chord-wise direction, the dovetail cross-section tapers between the leading and trailing root faces, and each of the wedges tapering in the radial direction such that, along the radial direction, the dovetail cross-section tapers between the inner root face and the second end of the airfoil section.

* * * * *